Oct. 25, 1966  F. C. BADALICH  3,280,699
FILM STRIP PROJECTOR

Filed June 11, 1963  7 Sheets-Sheet 2

Fig. 2

Inventor
Frank C. Badalich
by Hill Sherman Meroni Gross & Simpson
Attys

Oct. 25, 1966  F. C. BADALICH  3,280,699
FILM STRIP PROJECTOR

Filed June 11, 1963  7 Sheets-Sheet 6

Inventor
Frank C. Badalich

United States Patent Office 3,280,699
Patented Oct. 25, 1966

3,280,699
FILM STRIP PROJECTOR
Frank C. Badalich, Chicago, Ill., assignor to Bell & Howell Company, Chicago, Ill., a corporation of Illinois
Filed June 11, 1963, Ser. No. 287,145
20 Claims. (Cl. 88—26)

This invention relates to improvements in projectors and more particularly concerns a film strip projector which can also be used as a slide projector.

Prior dual function projectors, that is projectors capable of handling strip film and also slides alternately, have been characterized by cumbersomeness and often complex mechanisms and in any event have required housings and supporting structures which have not been adaptable for compact, streamlined construction and styling.

Strip projectors have heretofore been of limited capacity and generally unsatisfactory in their arrangements for handling the film.

Much has been left to be desired in the matter of automation of film strip projectors not only with respect to the selection and driving of the successive film strip frames, but also in focusing.

An important object of the present invention is to provide a new and improved strip film projector having novel means for readily converting it for use as a slide projector.

Another object of the invention is to provide an improved compact film strip projector having novel means for remote control operation.

A further object of the invention is to provide in a strip film projector new and improved power and manual operating means.

Still another object of the invention is to provide novel driving means in a strip film projector enabling both film advancing drive and focusing.

Yet another object of the invention is to provide novel powered focusing drive means in a film strip projector.

A still further object of the invention is to provide improved film handling means in a strip film projector.

A yet further object of the invention is to provide a novel automatic threading device for the film in a film strip projector.

Another object of the invention is to provide a novel film loading arrangement for film strip projectors affording the ability to handle either cartridge packaged or loose coils of strip film.

It is also an object to provide a novel strip film cartridge as well as means for feeding film from the cartridge and rewinding the film into the cartridge.

Among further objects is the provision of a compact unitized strip film projector.

Other objects, features and advantages of the present invention will be readily apparent from the following detailed description of certain preferred embodiments thereof taken in conjunction with the accompanying drawings, in which.

According to the present invention, an unusually small compact and substantially streamlined projector unit is provided contained within a housing 15 (FIG. 1) adapted to be constructed as a cast or molded casing of suitable light weight material such as aluminum alloy, rigid plastic, and the like. In a desirable form, this casing 15 is divided into a left hand longitudinal shell 17 affording an enclosure for the left side portion of the machine and a right side shell assembly comprising a rear right shell section or portion 18 and a front right section or shell portion 19, with the front portion separably attached in any suitable manner to the rear portion 18. Desirably the front shell portion 19 is attached by suitable hinge means 20 to the front end of the shell 18, with the two right side shell portions 18 and 19 being generally complementary to and completing the housing casing with the left side shell 17. Thus, the front shell portion 19 is swingable open, on the order of a door, to permit access to the interior front right hand area of the housing.

Figure 2:
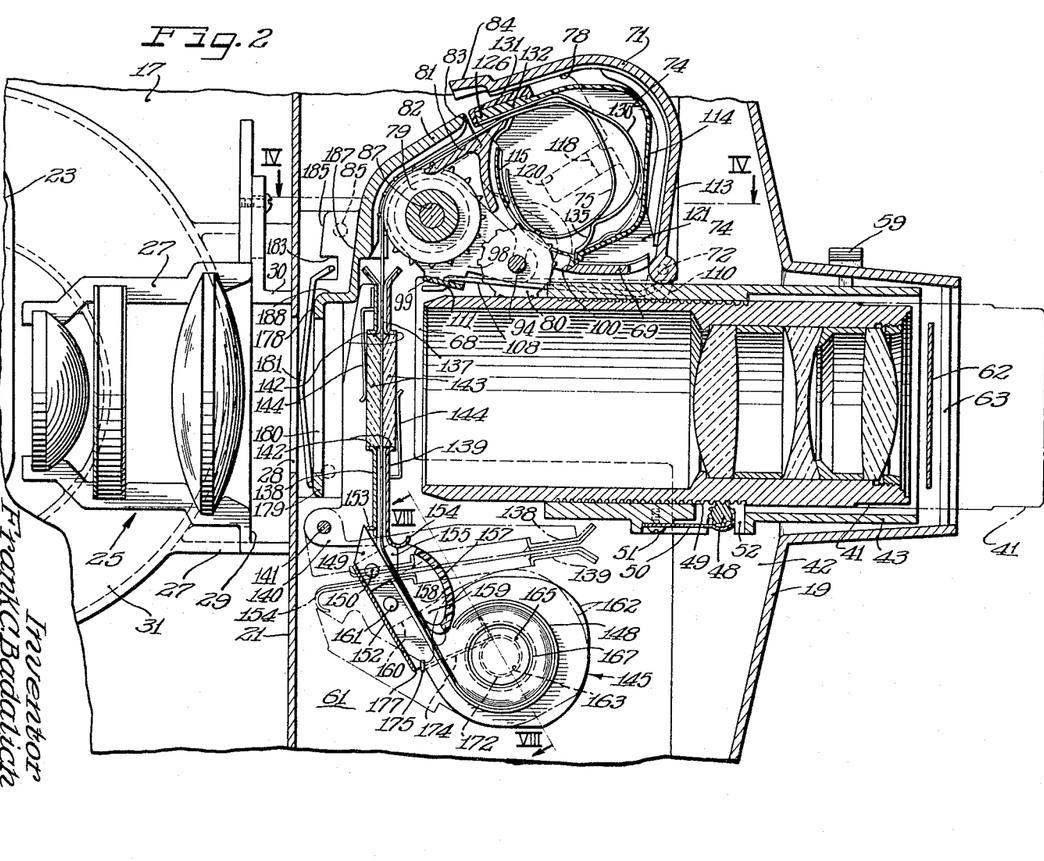
FIGURE 2 is an enlarged fragmentary longitudinal vertical sectional detail view taken substantially on the line II—II of FIGURE 1 on a somewhat enlarged scale.

Within the housing 15 the various mechanisms of the machine are unitized and are compactly arranged in a cooperative, compartmentalized relation. To this end, there is provided in substantially the rear half of the housing 15, behind a vertical transverse partition 21, disposed in a plane substantially coincident with the front end of the casing shell portion 18, a right hand compartment 22 having supported substantially centrally therein a projection lamp 23 in a suitable mounting socket 24 and in alignment with a concentrating or condenser lens system 25 carried by a suitable bracket structure 27 behind the partition 21 and with the optical axis of the lens system centered with respect to a substantially rectangular projection aperture 28 through the partition 21 (FIG. 2). This aperture 28 is of proper size for framing slide-mounted transparencies for projection when carried by a suitable shiftable slide carrier (not shown) adapted to be accommodated in horizontal transverse sliding relation within a carrier slideway or track 29 provided by and between the bracket 27 and the partition 21. A vertically adjustable clip 30 is mounted on the front face of the bracket 27 above the aperture 28 to cooperate guidingly with the upper edge of the slide carrier.

In a preferred construction, the lens bracket 27 comprises an integral projection from a cooling fan housing 31 mounted within a cooling fan compartment 32 within the rear portion of the left hand housing casing 17 alongside the lamp compartment 22. In general alignment with the projection lamp 23, the housing 31 has a reinforcingly flanged ventilation inlet opening 33 of substantial diameter with which a suction-blower-type centrifugal fan 34 is coaxially aligned within the fan chamber of this housing. Driving power for the fan 34 is provided by an electrical motor 35 mounted on a carrying side closure plate 37 of the fan housing and having a drive shaft 38 extending through the wall plate 37 and supporting the fan 34 rotatably. Air sucked in through the opening 33 is discharged rearwardly through a discharge port 39 of the housing aligned with an exhaust opening 40 in the rear panel of the housing shell 17.

Figure 1:
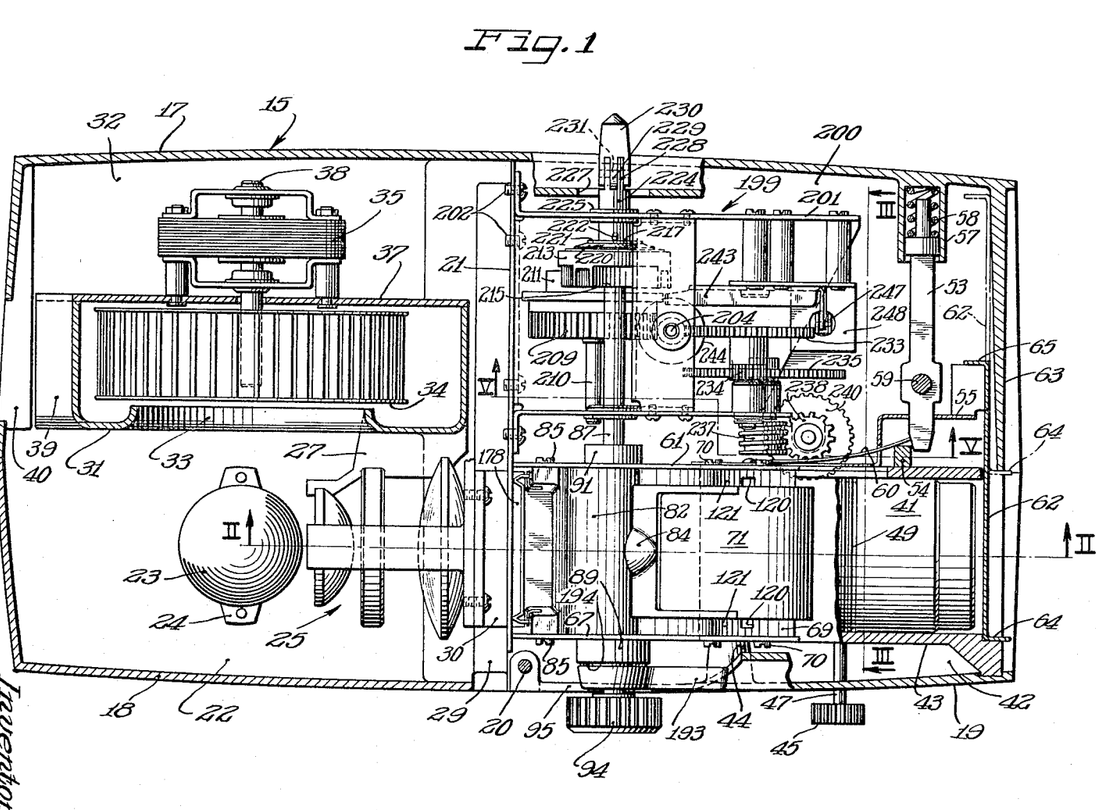
FIGURE 1 is a top plan view partially in section, of a strip film projector embodying features of the invention.

As is well apparent from FIGURES 1 and 2, suction of cooling air through and past the lens assembly 25 and past the projection lamp 23 from within the fairly commodious chamber 22 will maintain an efficiently cool condition during operation of the machine. Cooling air is permitted to enter the front of the chamber 22 through at least the projection aperture 28 in the partition 21 and the opening through the housing into the slide carrier track 29, generally in line with the lens system 25 and the projection lamp. Heated air is effectively drawn laterally from the projection lamp chamber and discharged rearwardly for continuous ventilation and cooling during operation of the machine.

Forwardly of the vertically transverse substantially median partition 21, and axially aligned with the optical axis of the lens system 25 is a focusing lens assembly of any preferred construction including a tube or barrel 31 housed within a projection compartment 42 defined within the outwardly swingable door front casing portion 19 of the housing. Longitudinally slidable focusing adjustment support for the lens barrel 41 is provided by a generally tubular lens carrier 43 rigidly mounted on the casing door 19 which is provided with inwardly projecting attachment bosses 44 (FIG. 1) to which the carrier is detachably secured. Through this arrangement, the focusing lens is movable laterally with swinging open of the door 19 to clear the lens and carrier 43 from the compartment 42 when access to the interior of the projection compartment is desired.

Figure 3:
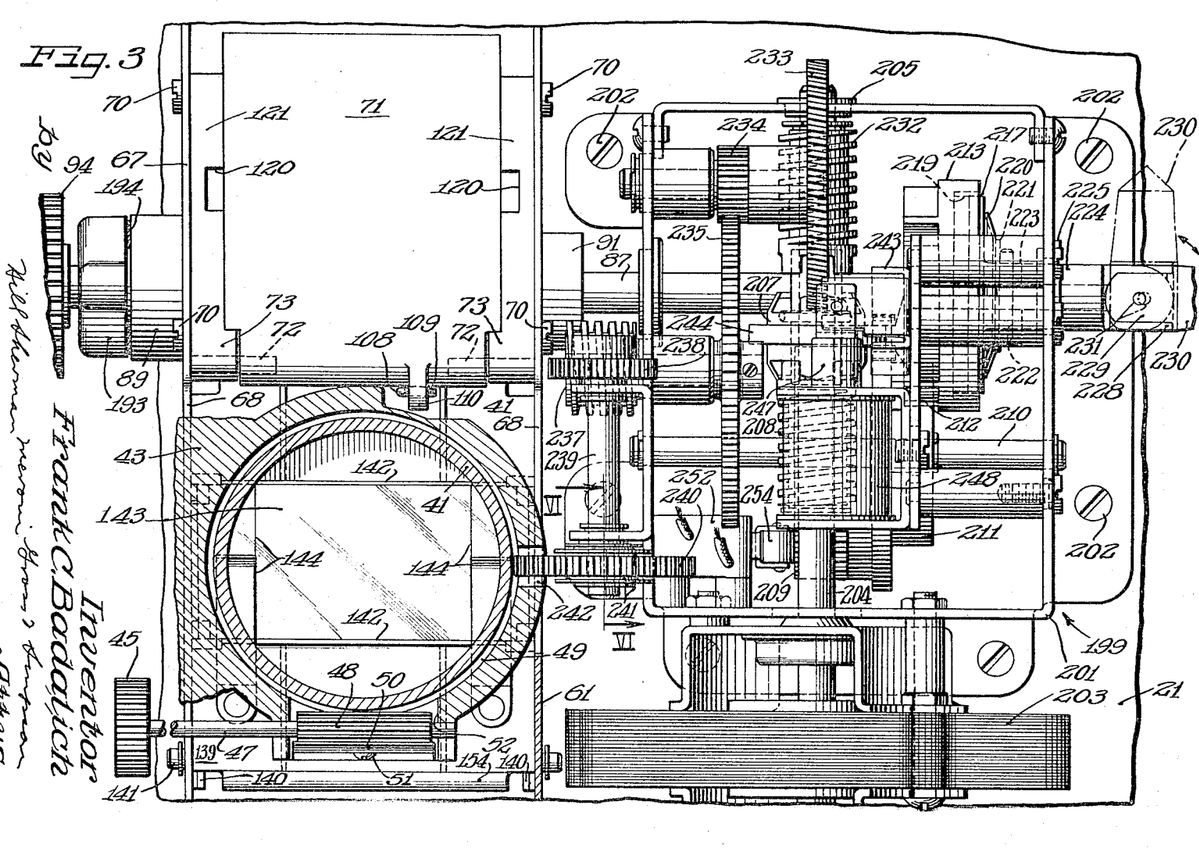
FIGURE 3 is an enlarged fragmentary vertical transverse sectional elevational detail view taken substantially along the line III—III of FIGURE 1.

Manual focusing adjustment of the lens tube 41 is enabled by means of a knob 45 accessible externally on the door 19 and attached to a focusing adjustment shaft 47 extending through the door 19 and having on its inner end portion an adjustment gear or pinion 48 meshing with a longitudinal series of annular teeth 49 provided on a substantial length of the perimeter of the lens tube 41 (FIGS. 1, 2 and 3). Resiliently flexible operative retention of the manual focusing gear 48 is effected by means of a leaf spring arm 50 attached by means of a screw 51 to the lens carrier 43 and biasing the gear 48 into positive meshing engagement with the adjustment teeth 49 within a gear socket and access aperture structure 52 in the lower portion of the wall of the lens carrier. Thus, by manipulation of the focusing knob 45 adjustment of the focusing lens tube 41 longitudinally between retracted position as shown in full line in FIGURE 2 and protracted position as shown dot dash outline is enabled for focusing purposes.

Means are provided for releasably latching the door 19 of the casing in closed position, desirably comprising a catch 53 (FIG. 1) in the form of an elongated slidable bar member mounted in the forward extremity portion of the left side housing casing portion 17 to extend transversely thereacross and having a tapered front end portion engageable with a rigid keeper projection 54 carried by the inner side of the front end portion of the door 19. Longitudinally reciprocable mounting support for the catch 53 is provided adjacent to its catch end by a bracket 55, while its opposite end portion is reciprocably slidably mounted in a hollow boss projection 57 extending inwardly from the wall of the casing number 17 and housing a biasing spring 58 normally urging the catch bar member 53 toward latching position. The construction and relationship is such that when the door 19 is moved into its closing position, the catch automatically resilient snaps into latching relation to the keeper projection 54.

Manual release of the catch 53 is enabled by means of a handle 59 accessibly disposed above the catch bar. When the catch 53 is released, the door 19 can be syung open, and desirably a resilient opening starter is provided in the form of a biasing leaf spring 60 attached at its rear end portion fixedly to a vertical longitudinally extending rigid partition plate 61 from which the bracket 55 extends and with the forward free end portion of the leaf spring extending through the bracket and into engagement with the projection 54, substantially as shown, under resilient flexure in the closed position of the door 19. As a result, when the latch is opened, the door 19 is started toward open position by resilient pressure of the leaf spring 60 against the projection 54.

A protective lens cover and safety latch is provided in the form of a laterally slidable plate 62 which is supported in a generally vertical plane in a guideway inwardly or rearwardly along a front panel 63 of the casing shell 17 and in front of the bracket 55. Thereby the cover and safety latch plate 62 is movable manually, through the aid of an outwardly projecting handle flange 64, from a retracted out of the way position behind the front wall panel 63 into lens-protecting relation across the front opening into the lens mount or carrier 43. In the fully protracted position, an inwardly extending stop flange 65 on the opposite end of the plate engages the bracket 55, thereby stopping the plate short of the adjacent outer side wall of the cover 19, in a convenient position to be grasped for manipulation of the handle flange 64. In its lens protecting, covering position, the plate 62 serves as a safety latch since should the catch member 53 of the retaining latch for the cover 19 be accidentally released, engagement of the end of the adjacent inner side wall portion of the lens and carrier 43 engaging the plate 62 will hold the cover against swinging open to any appreciable extent until the cover and safety latch plate 62 is retracted into its fully open position behind the casing wall panel 63.

Figure 4:
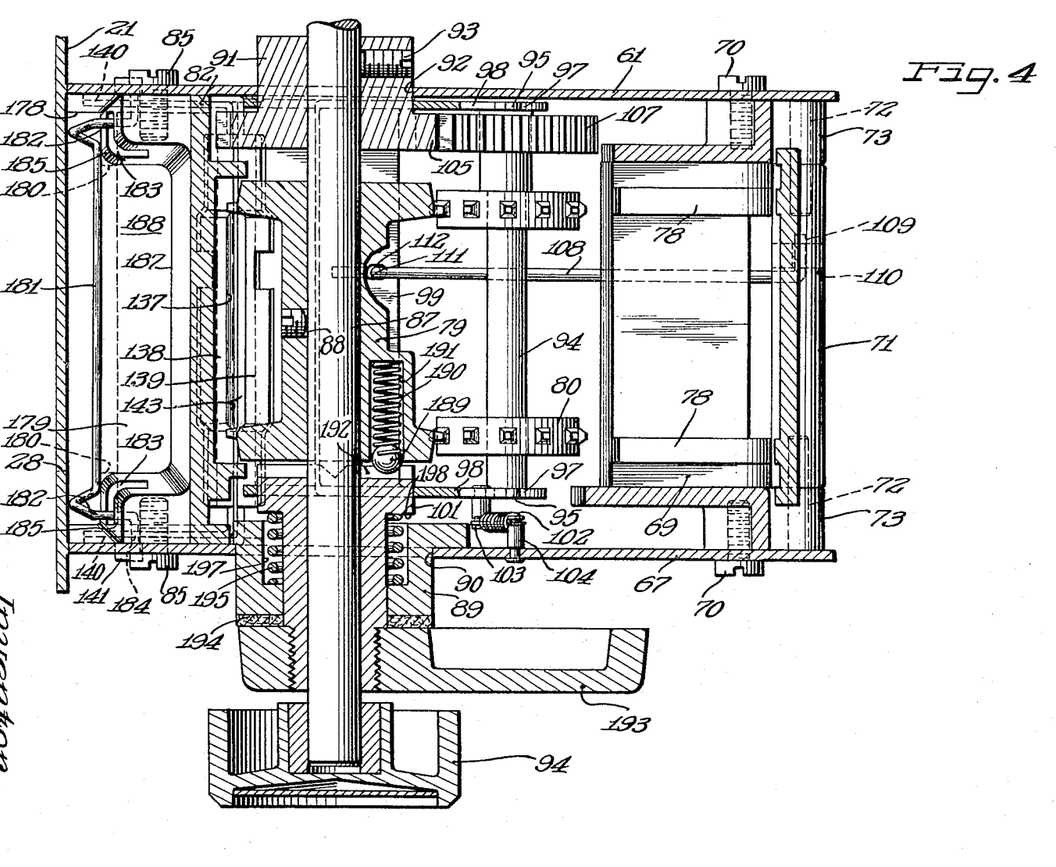
FIGURE 4 is an enlarged fragmentary horizontal sectional detail view taken substantially along the line IV—IV of FIGURE 2.

Also housed within the projection compartment 42 are strip film supply or magazine, feeding and takeup means to which access may be had by opening the door 19. Such means are desirably constructed and arranged as a compact mechanism unit adapted to be made as a bench assembly and mounted within the projection compartment 42. For this purpose, a vertical frame plate 67 is provided in spaced parallel relation and generally complementary to the inner front to rear partition plate 61 which provides the inner side of the supporting frame structure (FIGURES 1, 3 and 4). These frame plates 61 and 67 are of sufficient height to extend substantially above and below the lens carrier 43 and for purposes of compactness in assembly are intermediately cutout as shown at 68 in order to afford clearance for the sides of the lens carrier, it being understood, of course, that the cutout 68 of the frame plate 67 is large enough to permit free swinging of the lens carrier 43 therethrough when the door 19 is opened. Carried between complementary upper portions of the frame plates 61 and 67 in a position above the clear of the lens carrier 43 is a film magazine assembly (FIGURES 1-4) including a stationary magazine housing portion on member 69, desirably in the form of a cast or molded part providing a bottom and front wall for the magazine and secured to the plates at its respectively opposite sides by means of screws 70 and thereby providing a rigid part of the upper framework of the film unit. A second component of the magazine comprises a cover member 71 of generally L-shape in longitudinal section, providing a front and upper wall for the magazine. At its lower end the cover is pivotally attached as by means of hinge pins 72 between hinge bosses 73 on the lower forward portion of the fixed magazine member 69. Through this arrangement, the film magazine is adapted to be opened by swinging the cover member 71 forwardly so that film loading and removal access into the magazine can be had through the top and front.

Figure 7:
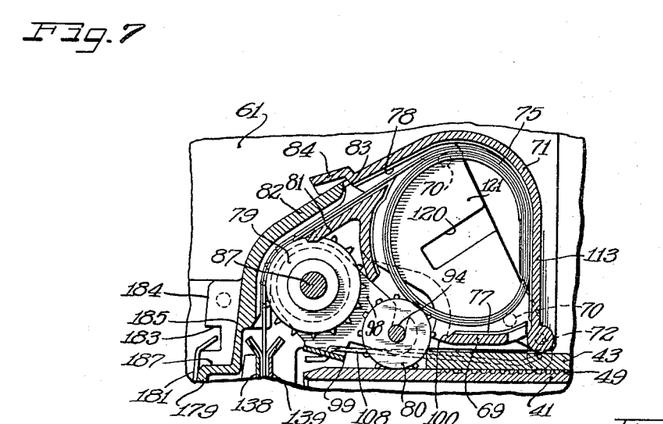
FIGURE 7 is a fragmentary vertical sectional detail view of the supply magazine and film feed portion of the machine demonstrating the handling of a loose coil of strip film.

According to the present invention, the film magazine is adapted either to receive a cartridge 74 loaded with a film strip roll or coil 75 (FIG. 2) or to receive the film strip 75, as such, so that the projector is usable alternatively with loaded film cartridges or with loose film strips as commonly supplied in small cans from which the coil of film must be removed for loading into the projector (FIG. 7). To prevent scratching of the frame-carrying portion of the film strip when loaded directly into the magazine, the film-opposing surfaces of the fixed magazine member 69 are provided with spaced parallel longitudinal strip-margin-engaging spacer lands 77 and the cover 71 is provided with corresponding aligned spacer lands 78. Further, the magazine is of a size to accommodate an unusually large roll of the strip film 75, on the order of nine to ten feet.

Means are provided for self-threading feeding of the film strip 75 from the magazine and for facilitating rewinding of the film strip into the magazine, and comprising a main feed sprocket 79 and an auxiliary film drive roller or feed sprocket 80. These sprockets are mounted and arranged in such a manner that they operate in unison, with the auxiliary sprocket 80 functioning in dual capacity of starting the feed and then continuing to assist in feeding of the film from the magazine without jamming, binding or cinching during projection feed, as well as during rewinding acting to drive the film into rewound coil relation without binding, inclusive of the trailing end of the film or its leader, fully into the magazine or cartridge. By virtue of the cooperative relation of the sprockets 79 and 80, the arrangement is such that overhand feeding is efficiently accomplished, that is, the film 75 is fed from the top of the roll downwardly and rearwardly over a diagonal film track extension 81 on the upper rear portion of the magazine number 69 providing a film receiving throat with an overlying complementary spaced film guide plate 82 having its upwardly and forwardly directed edge formed with a curved lead-in surface 83 cooperative with the rear edge of the cover member 71 (FIG. 7) in its closed position. A handle lip flange 84 on the cover overlies the adjacent portion of the film guide 82. In a preferred construction, the guide plate 82 comprises a casting or molding constructed to be mounted between and attached to the frame plates 61 and 67 as by means of screws 85 (FIGS. 1 and 4) and serving as part of the rigid frame structure for the upper portion of the film unit.

As best seen in FIGURES 2 and 7, the film guiding path or track defined between the track extension 81 and the overlying guide plate 82 extends diagonally downwardly and rearwardly tangentially to the upper rear portion of the perimeter of the film driving sprocket 79 which is mounted on a shaft 87 to which the sprocket is adjustably but fixedly attached corotatively as by means of a set screw 88. Rotary support is provided for the shaft adjacent to the casing side door 19 by a bearing hub 89 mounted fixedly on and extending outwardly through an aperture 90 in the frame plate 67. Coaxial bearing support for the shaft 87 on the frame plate 61 is afforded by a journal hub 91 extending through a bearing aperture 92 and fixedly attached corotatively to the shaft as by means of a set screw 93. Rotation of the shaft 87 to drive the sprocket 79 is adapted to be effected manually through manipulation of a knob 94 attached corotatively to an end portion of the shaft projecting beyond the outer end of the hub 89 and accessible externally adjacent to the door 19 which has a clearance opening 95 therein (FIG. 1) to pass the sprocket driving structure when the door is swung open.

Means are provided for driving the auxiliary film sprocket 80 at a differential slightly overrunning peripheral speed of rotation, but in the opposite rotary direction from that of the main film sprocket 79. To this end, the sprocket 80 includes a shaft 94 provided with respective reduced diameter opposite terminal journalled portions 95 engaged in generally upwardly opening bearing slots 97 in respective bearing arms 98. These arms comprise complementary generally forwardly extending spaced parallel flat vertical coextensive flanges connected together into a rigid integral unit by a body bar 99 to provide a sprocket carriage mounted in such a manner as to maintain the auxiliary sprocket on a parallel axis with and operatively aligned in respect to the main sprocket 79 between the film magazine and the main sprocket to project upwardly and forwardly through an opening 100 (FIGS. 2 and 7) in the arcuate fixed magazine wall provided by the magazine member 69.

In order to enable automatic adjustment of the film sprocket 80 to variable diameters of the roll of film strip 75 and to assure firm engagement of the outermost coil of the film strip in the magazine, means are provided for rockably mounting the auxiliary film sprocket carriage. To this end, the bearing arm 98 adjacent to the frame plate 61 is rockably engaged upon the main film sprocket hub 91 serving as a bearing (FIG. 4). The opposite bearing arm 98 is rockably supported on a cylindrical bushing 101 carried by the sprocket shaft 87 within the fixed hub member 89. Normally the auxiliary film sprocket 80 is biased upwardly toward or into the clearance opening 100 in the magazine wall by means such as a tension spring 102 attached at one end through an anchoring stud 103 on the adjacent bearing arm 98 and its opposite end to an anchoring stud 104 mounted on the frame plate 67. Through this arrangement, the rocking arc of the auxiliary sprocket 80 is concentric with the axis of the sprocket shaft 87 whereby to maintain in mesh a driving gear flange 105 on the hub 91 and a pinion 107 fast upon the sprocket shaft 94 whereby the auxiliary sprocket 80 is driven in unison with but in opposite rotary direction to the main sprocket 79.

Since it is desirable to retract the auxiliary film sprocket 80 from the magazine during loading and unloading of the magazine, means are provided to function when the cover 71 is opened to depress the auxiliary sprocket carriage and thus the auxiliary sprocket relative to the magazine. For this purpose a rod link 108 is connected through an angular terminal 109 at one end to a downwardly projecting lug 110 on the lower hinged edge of the cover 71. At its opposite end portion the link 108 is provided with an angular shoulder 111 engaging through a complentary aperture 112 in the sprocket carriage bar 99 (FIGS. 2, 4 and 7). Through this arrangement, in the magazine closing position of the cover 71 the auxiliary film sprocket 80 is free to enter the magazine operatively through the clearance opening 100 under the bias of the spring 102. When the cover 71 is opened, the lug 110 is swung rearwardly and actuates the link 108 to drive the shoulder 111 against the carriage bar 99 which, due to its location along the lower margins of the bearing arms 98 rearwardly from the auxiliary sprocket 80 and below the main sprocket 78, causes the sprocket carriage to be pivoted downwardly in opposition to the biasing spring 102 for thereby retracting or releasing the auxiliary film sprocket 80 from the magazine.

Loading of a roll of the strip film 75 into the magazine can be effected without stripping the leading end of the film or leader and without regard to its position within the magazine except that it be oriented for counterclockwise feeding movement as viewed in FIGURES 2 and 7. Upon movement of the cover 71 toward closed position, the auxiliary film feed sprocket 80 moves into engagement with the outside coil of the film roll and the sprocket teeth engage within the usual sprocket holes in the margins of the film strip. Then, upon actuation of the main film sprocket 79 in a counterclockwise direction as seen in FIGURES 2 and 7, the auxiliary sprocket 80 is simultaneously driven in clockwise direction and drives the film strip counterclockwise so that its leading end is directed toward the film track defined between the track extension 81 and the film guide 82, eventually automatically reaching the main sprocket 79 so that its teeth engage within the sprocket holder of the strip to take over the primary feeding of the strip.

To avoid damage to the sprocket hole areas of the film strip engaged by the auxiliary film sprocket 80, the film engaging sprocket wheel portions thereof are at least in the film engaging perimeter and sprocket teeth made from a resiliently flexible elastomeric material having the properties of rubber of sufficient softness to permit substantial yielding of the sprocket teeth during misalignments, differential surface speeds of the sprocket and the engaged film, and the like. Such resilient yieldability of the sprocket teeth is especially valuable after the main film sprocket 79 takes over advancing movement of the film. Further, the high coefficient of friction of a rubber material is advantageous since positive though yieldable film driving force is applied in the running of the auxiliary film sprocket even though the sprocket teeth may be out of register with the sprocket holes in the film.

Binding or seizing of the film against any roll-encompassing surface is avoided by an asymmetrical shape of encompassing wall surfaces within the magazine both in respect to the surfaces engaged by or opposing the film when not using a film cartridge as shown in FIGURE 7, or when using the cartridge 74 as shown in FIGURE 2. For this purpose, the cover 71 is provided with a substantially straight wall portion 113 generally opposite the sprocket clearance aperture 100 and toward which the sprocket 80 drives the film during film feeding. This straight wall portion leads into a smoothly curved portion which directs the film into the film track, the first portion of which is formed in part by the handle end portion of the cover 71 in the non-cartridge accommodation of the film roll, as shown in FIGURE 7. This generally straight wall portion 113 is also advantageous during rewinding when the film is moving into the magazine and the auxiliary film sprocket 80 in its film-coiling action tends to drive the coil toward the flat wall surface.

Within the cartridge 74 the coil encompassing surfaces are substantially complementary to the surfaces within the magazine and for the same purposes, including a substantially flat wall portion 114 (FIGS. 2, 11 and 12) generally opposite an opening in the otherwise continuous coil encompassing wall through which a film strip coil can be loaded into the cartridge and which is then partially closed by a coil retaining cover 115 provided with sprocket clearing marginal clearance openings 117 at each side. These openings are maintained in proper orientation to the film engaging wheel portions of the sprocket 80 within the magazine by engagement of elongated rearwardly and downwardly extending locating lugs 118 provided externally on opposite side wall panels 119 (FIGS. 10–13) and slidably engageable in complementary sockets 120 (FIGS. 1 and 7) provided in opposite side walls 121 of the magazine member 69. When fully mounted within the magazine, a film guide projection 126 on the upper portion of the coil encompassing wall of the cartridge overlies the magazine track extension 81 and cooperates with the guide 82 to afford the substantially closed film track enabling automatic threading of the film from the cartridge by action of the film sprocket 80. As observed in FIGURE 2, the magazine cover 71 acts in partially closed relation in engagement with the cartridge 74 as a cartridge retainer resisting upward and forward displacement of the cartridge by pressure of the sprocket 80 against the roll of film within the cartridge. In this what may be termed latching engagement of the cover 71 with the cartridge assistance is afforded by the linkage connection of the cover with the spring biased auxiliary sprocket carriage by virtue of the over-center toggle connection of the link 108 with the toggle connecting lug 110 of the cover.

Figure 11:
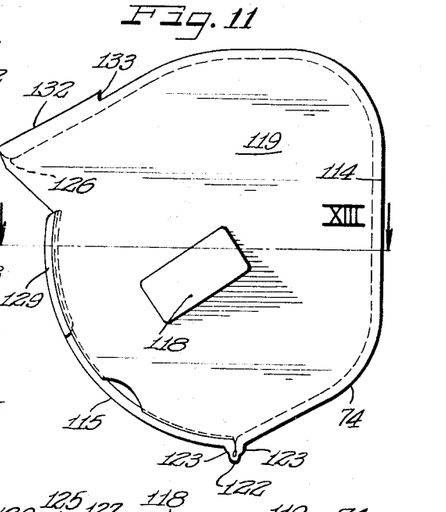
FIGURE 11 is a side elevational view of the cartridge.
Figures 12, 13:
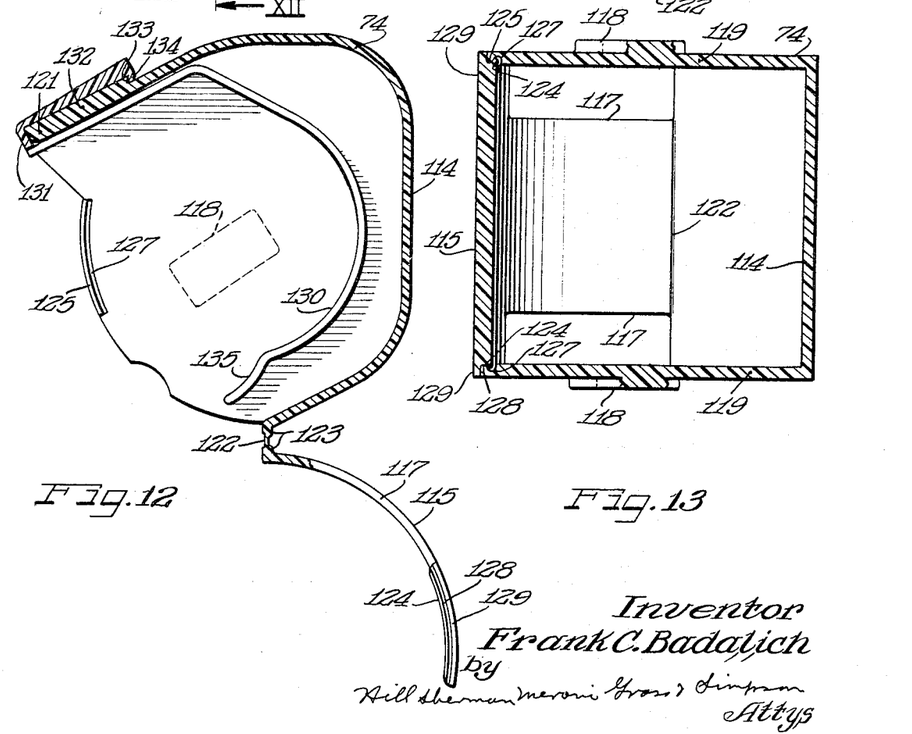
FIGURE 12 is a vertical sectional detail view through the cartridge taken substantially along the line XII—XII of FIGURE 10.
FIGURE 13 is a horizontal sectional detail view through the cartridge taken substantially on the line XIII—XIII of FIGURE 11.

For purposes of economy it is desirable to make the cartridge 74 as a unitary, one-piece synthetic plastic molding. Excellent results have been obtained where the material from which the cartridge is molded is polypropylene which has excellent self-sustaining qualities in the molded state but is possessed of sufficient resilience to enable not only integral hinging of the cover 115 but also integral snap-latch retention of the cover. Thus, an integral hinge 122 is provided as best seen in FIGS. 11 and 12, to connect the end of the cover 115 nearest the flat wall portion 114 to the encompassing wall of the cartridge. This hinge is formed as a narrow flexible web of substantially thinner section than the section of the cartridge wall and attached to respective parallel adjacent outwardly offset ribs 123 on the adjacent ends of the cover and wall, in such manner that when the cover is closed as shown in FIGURE 11, the hinge provides a fold externally of the cartridge chamber while the connected ends of the cover and wall substantially close the gap therebetween to avoid catching of a film end in the joint.

For latching the cover 115 in closed position, the side edges of the cover adjacent to its distal end and the engaged margins of the side walls 119 of the cartridge are provided with complementary respective latching tongue ribs 124 and 125 and tongue receiving grooves 127 and 128, as best seen in FIG. 13. This relationship is such that the cover latching rib tongues 124 engage interlockingly behind the complementary tongue ribs 125 on the cartridge side walls with a snapping action enabled by the resiliency of the side walls 119, and with opposite side flanges 129 on the cover engaging the underlying edges of the respective side walls 119. By virtue of this construction, firm closing, film retaining retention of the cover is effected, but when desired the cover can be snapped open by pulling on its distal end to separate the latching tongue ribs 124 and 125.

In order to assure free feeding and rewind turning movement of a maximum length roll of the film 75 within the cartridge 74, means are provided which will tend to keep the film compactly coiled, in cooperation with the auxiliary feeding roller or sprocket 80. For this purpose, a pair of roll-engaging and cradling spring arms 130 (FIGS. 10, 11 and 12) are provided laterally spaced within the cartridge to engage the non-frame marginal areas of the film strip and comprising integral parts of a retaning clip 131 which is engageable with the film guiding lip projection 126 provided on its outer side with a latching crown 132 affording a forwardly facing shoulder 133 with which a clip detent terminal 134 is retainingly engageable. Through this arrangement, the clip 131 is adapted to be assembled with the cartridge when the cover 115 is open, by sliding the clip onto the lip 126 and moving the arms 130 into the cartridge chamber. Normally the arms 130 are contracted or spaced from the encompassing wall of the cartridge except in the clip ends of the legs, as shown in FIGURE 12. When a full roll of film is loaded into the cartridge, the resiliently flexible spring legs 130 are sprung toward and may engage with the opposing portions of the encompassing wall as shown in dash lines in FIGURE 2, with the tips of the ramp terminals 135 at the clearance openings 117 and guiding the leading end of the film as driven by the auxiliary sprocket 80 during initial film feeding action and avoiding catching of such end on the tips of the spring arms. As the film roll diminishes the spring arms move inwardly. During rewind as the roll of film increases in diameter the arms 130 gradually spring open while maintaining coiling pressure on the film due to the spring tension of the arms.

Desirably the spring arms 130 and their connecting clip 131 are molded in one piece from a suitable synthetic plastic material. Polypropylene has been found to afford excellent results for this purpose.

As the film strip 75 is fed by the main film sprocket 79, the leading end of the strip is guided downwardly by the guide plate 82 into a vertical film gate passage 137

(FIGURES 2 and 4) defined by film gate plates 138 and 139 which are secured together and have lower coextensive lapping rearwardly extending side ear flanges 140 by which the film gate is pivotally mounted on a shaft 141 for movement between an out of the way downwardly pivoted position as shown in dot-dash outline in FIGURE 2 and the vertical film strip projecting position shown in full line. In the latter position, a film aperture through the film gate plates 138 and 139 is aligned on the optical axis of the lenses of the machine and of the projection aperture 28 in the partition 21. Such film gate aperture is defined along its upper and lower edges by respective coplanar pairs of oppositely projecting flanges 142 providing supporting and retaining surfaces for the upper and lower edges of a pair of opposed glass pressure plates 143 having their upper edges beveled downwardly and inwardly as shown in FIGURE 2 for leading in the end of the film strip during initial feeding. Means for yieldably separably biasing the plates 143 toward on another comprise respective transversely spaced substantially identical pairs of light leaf spring fingers 144, one pair of which is secured to the film gate plate 138 above the upper flanges 142 and extends downwardly to at least the vertical center of the associated plate, while the other pair of retaining spring fingers is carried by the aperture plate 139, mounted below the lower flanges 142 and projecting upwardly to at least the center of the associated plate. Both sets of retaining fingers 144 are vertically aligned as best seen in FIG. 3 and frame the sides of the film aperture while providing horizontally aligned biasing pressure pressing the plates together relatively lightly but with sufficient firmness to maintain each frame of the film flat and in a plane normal to the projection axis.

Figure 8:
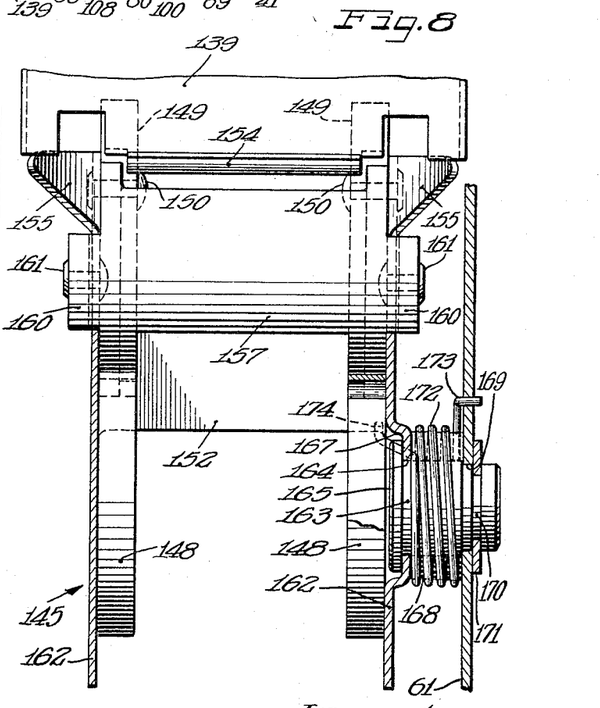
FIGURE 8 is an enlarged fragmentary horizontal sectional elevational detail view taken substantially along the line VIII—VIII of FIGURE 2.

From the film gate assembly, the film strip is advanced into a take-up assembly 145 (FIGS. 2 and 8) located generally under the focusing lens assembly and of a generally complementary construction relative to the magazine so as to receive and coil substantially the full length of the film strip 75, and if necessary the full length thereof, without binding or buckling of the film. To this end, the film strip is guided from the lower end of the track passage 137 of the film gate by a downwardly and forwardly oblique track arrangement comprising a pair of spaced parallel substantially coplanar film margin engaging track members 147 having their upper rear end portions aligned with the film gate track exit. These take-up tracks are desirably rearward supporting extensions of and integral in one piece with expansible film coiling take-up spring loops 148 which are turned up and over the lower end portions of the track lengths of the combination track-take-up loop members. Normally the take-up loops 148 are disposed on a substantially smaller diameter than the anticipated maximum diameter of a fully taken up coil of strip film, with the free ends of the loops sufficiently spaced from the adjacent portions of the track extensions to avoid interferring with reception of the leading end of the film strip into the take-up loops. This starts the take-up coil of film on a relatively small diameter, and then as the film strip coil winds upon itself to such compactness as to expand its diameter, the take-up loops 148 expand with the expanding diameter of the coil. Then as the film coil diameter gradually increases, the take-up coils 148 gradually expand under progressive tension whereby to maintain the take-up coil continuously relatively tight but without any undue restraint upon continuing winding of the film coil upon itself within the loops. As a result, there is complete freedom from binding of the coiling film strip during take-up and the take-up coil of film is accommodated with minimum take-up space. During rewinding of the strip film as it is withdrawn from the take-up assembly 145, the spring loops 148 by their continuing embrace of the film coil maintain the unwinding film coil under guided control to pay out along the track sections 147 to the lower end of the film gate without strain or danger of binding of the film. Either take-up movement of the film into the take-up assembly or withdrawal of the film from the take-up assembly during rewinding may be effected at high or low speed with equal efficiency.

While the combination track and take-up loop members 147–148 may be made from any suitable material having the requisite self-sustaining but resiliently flexible characteristics, they are desirably formed as castings from polypropylene. In a practical form, the expansible loop portions 148 has been about .035 inch in thickness and about .187 inch in width with a normal, unexpanded loop radius of about .59 inch. This has easily accommodated film coil up to ten feet in length within the expanded take-up loops 148.

Mounting of the film track-loop members 147–148 is effected in a manner to be not only fully cooperative with the erect film gate assembly for strip film projection, but also to accommodate collapsing, downwardly swung, out of the way inactive disposition of the film gate as shown in dot-dash position. To this end, the film tracks 147 are provided on their terminal end portions with rearwardly extending integral attachment blocks 149 secured as by means of rivets 150 to the inner sides of respective spaced parallel film guiding side flanges 151 of a retainer which may be formed up from sheet metal and includes a connecting base or web panel 152 along the lower rearward edges of the retainer flanges. At their rear extremities the block portions of the tracks are disposed in position to engage against a rearwardly angled horizontal flange 153 on the film gate plate 138 at the lower end of the film gate track 137. In addition, the attachment terminal block end portions of the tracks oppose a forwardly and upwardly curved camming flange 154 on the front film gate plate 139 at the lower end of the film gate track and offset downwardly relative to the flange 153 but in the film projection relationship of the components disposed in film passage gap relation to the take-up film track surfaces. Assistance in guiding the leading end of the film strip onto the take-up track is afforded by respective flaring lead-in terminal ears 155 on the side retaining flanges 151 and flanking the opposite sides of the camming flange 154.

Since in order to accommodate the collapsed relationship of the film gate and take-up assemblies it is desirable to have the film tracks 147 of substantial length so that the take-up loops 148 are substantially spaced from the discharge end of the film gate track, means are provided in association with the take-up tracks 147 between the take-up loops 148 and the cam flange 154 to guide the leading end of the film strip across the gap into the loops in spite of the normal curled bias of the leading end portion of the film tending to hook it forwardly as it passes the camming flange 154. To this end, a guide member 157 is provided which may be formed as a cast or molded part from suitable material, is of generally U-shape in cross-section and provides a longitudinally arched deflecting surface overlying the tracks 147 between spaced retaining side walls 159 resting upon the edges of the retainer flanges 158 and having projecting along the outer faces of these flanges respective attachment arms 160 secured as by means of rivets 161. Thereby, as the leading forwardly hooked end of the film strip passes the cam flange 154, it will, if the curling bias of the film is pronounced, engage the deflecting surface 158 and in the continuing take-up movement of the film strip be deflected toward the tracks 147 and more particularly toward the entrance gaps into the take-up loops 148.

Cooperative with the outer sides of the take-up loops 148 are respective parallel film retaining panel portions 162 integral with the forward ends of the retainer flanges 151 and of ample area to prevent edgewise escape of the film in the maximum expanded condition of the take-up spring loops. In addition, one of these retainer panels 162 serves as means for rockably mounting the take-up assembly unit 145 in the film compartment 42. Herein the panel 162 adjacent to the bracket plate 61 is pivotally mounted on a stud 163 extending through a bearing aperture 164 and having a thin flat head 165 accommodated within the inside face plane of the associated panel in an offsetting recess 167 providing a boss opposing a spacer bushing 168 about the shank of the stud to afford proper alignment of the take-up unit with the film gate. Beyond the bushing 168, the end portion of the stud 163 extends through a bearing aperture 169 in the frame plate 61 and has an annular groove 170 within which a retaining washer or ring 171 is engaged releasably. It will be appreciated, of course, that the pivotal mounting axis afforded by the stud 163 is properly correlated to the upwardly and rearwardly projecting take-up guide track structure of the unit 145 to assure proper correlation of the upper end of the track to the discharge end of the film gate track.

Means are provided for normally biasing the take-up unit 145 about its pivot to maintain the take-up track in its take-up relation to the lower end of the film gate with sufficient operative firmness, but to enable downward swinging of the take-up track structure when the film gate is moved toward non-operating, collapsed position. For this purpose, a coiled torsion spring 172 is mounted about the bushing 168 and has an anchoring arm provided with an angular anchoring lug 173 engaged through the frame plate 61. From its opposite end, the spring 172 has a biasing arm 174 provided with an inwardly angular generally hook-shaped engagement lug 175 which is biasingly engaged against a shoulder 177 at the inner end of the adjacent side retaining flange 151 where it joins the lower margin of the associated retainer and mounting panel 162. Through this arrangement, the biasing spring 172 acts at all times to maintain clockwise rotary bias on the take-up unit 145, as viewed in FIGURE 2, whereby through engagement of the terminal end portions of the track lugs 149 with the film gate flange 153 the spring bias is also reflected in the film gate to maintain the film gate against any tendency to drop or tilt forwardly out of its vertical projection position. However, when the film gate is swung into its out of the way position, it acts as a lever through the camming flange 154 bearing against the film track attachment blocks 149 to swing the take-up track structure generally counterclockwise to clear it from the path of the film gate. Then, the collapsed film gate through the camming flange 154 is substantially over-center locking relation below the pivotal axis 141 of the film gate maintains the collapsed relationship against the spring bias even though the torsion spring 172 is loaded to increased tension by this action. When the film gate is to be returned to projection position, lifting its distal end to release the camming flange 154 from its over-center latching relation, and the wound up, loaded spring 172 causes the film track structure of the take-up assembly 145 to lever the film gate into projection position with a substantially snap action, or at least affords a spring boost to erection of the film gate.

When the film gate is moved into its out of the way position, whereby its smaller framing aperture is removed from the optical path of the lenses projection of slides through the larger projection aperture 28 of the partition 21 is enabled where a slide holder in the holder track 29 is employed.

In addition, means are provided for projection of individual slides by downward feeding in a slide track 178 (FIGS. 1, 2 and 4) defined between the partition 21 and a slide guide 179 conveniently comprising a downward extension of the film guide member 82 and having a projection aperture 180 of preferably the same size as and aligned with the aperture 28. Slides to be projected are adapted to be fed into the upper end of the slide track 178 and are held frictionally in projection position by means such as a generally U-shaped wire spring 181 having load spring arms at each side of the apertures 28 and 180. Each of the spring arms has on its upper end portion an angular terminal 182 engaged retainingly through a respective slot 183 in the upper part of the slide track portion 179 and with the terminal lug portion of the terminal engaged releasably in a respective complementary socket 184 by spreading apart resilient tension of the spring arms.

Insertion of slides successively into the slide track 178 is facilitated by respective lead-in surfaces 185 on the upper part of the guide portion 179, above the aperture 180 and located at each side of a finger-clearance offset 187 opening upwardly and defined on its lower side by a upwardly facing stop shoulder 188 located at a proper elevation above the aperture 180 so that a slide placed manually into the slideway 178 can be gauged as to proper projection alignment with the apertures 28 to 180 by pushing it digitally downwardly against the frictional resistance of the spring 181 until the pushing finger of the manipulating hand comes to a stop against the shoulder 188. As succeeding slides are fed into position within the slide track 178, the immediately preceding slides are successively ejected from the lower end of the slide track.

Returning now to the film feed mechanism, both manual and power driven operation of the driving sprockets is provided for. Manual operation through manipulation of the knob 94 is facilitated by provision of a torque releasable detent device comprising a detent ball 189 (FIG. 4) biased by a coiled compression spring 190 from a longitudinal socket 191 opening from the end of the spool of the sprocket 79 which opposes the adjacent end of the bushing 101 which is provided with four equally spaced radially extending V-shaped clutch grooves 192 within which the detent ball 189 is clickingly engageable after each 90° turn of the sprocket 79 which is equivalent to advancing or rewinding actuation of the film strip one frame length, thus properly indexing the same.

For framing purposes, a framing lever 193 is fixedly secured to the outer end portion of the bushing 101 between the knob 94 and the adjacent end of the fixed bearing hub 89. A friction clutch arrangement is provided to hold the framing lever and bushing assembly normally against turning under the relatively light torque loads imposed by the detent 189 but enabling selective manipulation of the framing lever 193 for framing purposes, herein comprising a friction clutch washer 194 which may be of leather or the like interposed between the hub of the lever and the opposing end face of the bearing hub 89, with clutching compression imposed by a coiled compression spring 195 mounted about the bushing 101 within a counterbore 197 in the bearing hub and thrusting axially inwardly against an outwardly facing shoulder 198 on the inner end portion of the bushing 101.

Figure 5:
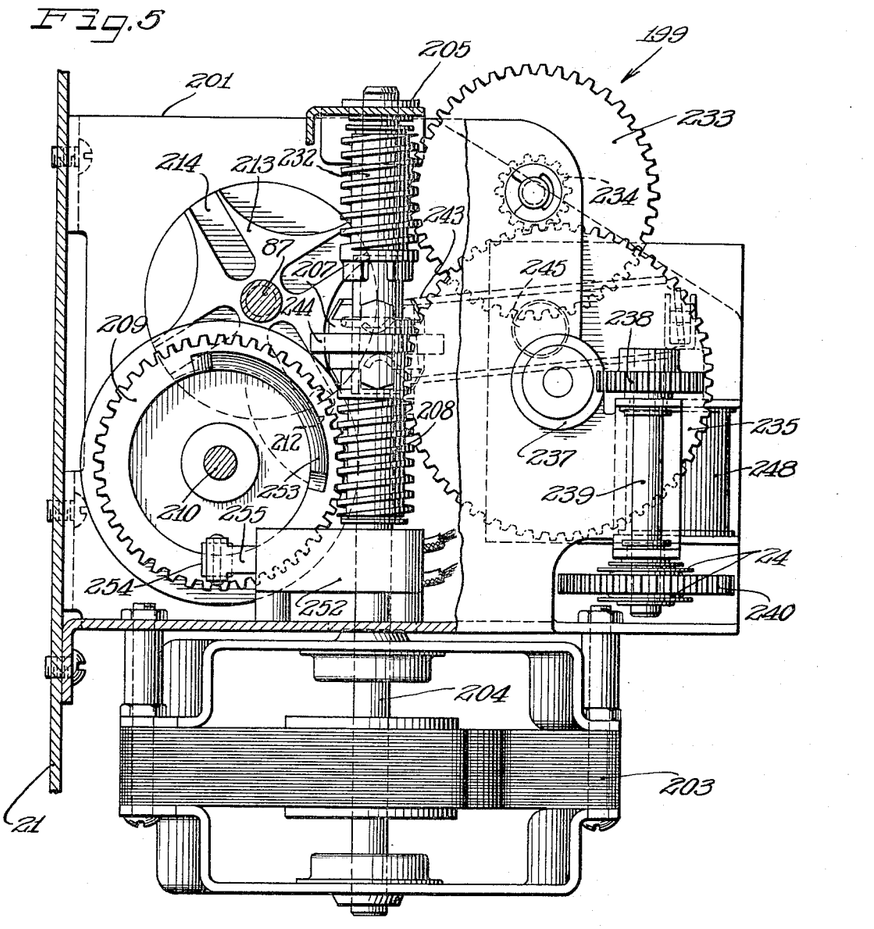
FIGURE 5 is an enlarged fragmentary vertical sectional elevational detail view taken substantially along the line V—V of FIGURE 1.

For powered actuation of the film driving sprocket assembly a power driving unit 199 (FIGURES 1, 3, and 5) is provided which is mounted within a fourth compartment 200 located alongside the projection compartment 42 in the left front portion of the housing 15 in an area defined by the front portion of the casing sheel 17 and the partition plates 21 and 61. This power unit includes a generally rectangular frame 201 secured as by means of screws 202 to transverse intermediate partition plate 21. On its lower side, the frame 201 supports a reversible electric motor 203 having an upwardly projecting drive shaft 204 which preferably extends throughout the height of the supporting frame and has its upper end portion journalled in a bearing 205 carried by the frame.

Intermediate its ends, the motor drive shaft 204 has corotatively but vertically shiftably keyed thereon an oppositely equally toothed dog clutch 207 which normally engages on its lower toothed end with the upper complementally toothed end of a driving worm 208 which is coaxially but normally freely rotatably supported on the shaft 204 below the clutch. This worm drives a Geneva movement by which the sprocket shaft 87 is driven step-by-step by film frame increments through an extension of the shaft projecting across the interior of the supporting frame 201. Such Geneva movement includes a Geneva gear 209 meshing with the driving worm 208 and mounted on a shaft 210 below and parallel to the shaft 87. Each revolution of the gear 209 effects a one film frame quarter turn intermittent indexing movement of the shaft 87 through the coaction of a cam 211 and a drive pin 212 on the gear with a star wheel 213 mounted on the shaft 87 and having four equidistant slotted radial arms with the customary intermediate concave cam engageable surfaces.

In order to enable disengaging the power drive from the shaft 87 when it is desired to effect manual driving of the shaft, means are provided for disconnectably coupling the Geneva wheel 213 to the sprocket shaft. To this end the Geneva wheel 213 is mounted for normal free rotation on the shaft 87 between an outwardly facing shoulder 215 on the shaft and a concentric clutch plate 217 which opposes an outwardly facing clutch surface 218 on the Geneva wheel to clamp an interposed friction clutch disk 219. Normally the clutch plate 217 is clutchingly thrust by a spring washer 220 bearing against its outer face and backed against a washer 221 held in placed by a transverse pin 222 through the sprocket shaft 87. This pin also serves as a corotational coupling for the clutch plate 217 by extending through longitudinally elongated diametrically aligned keying slots 223 in a tubular stem 224 integral with the clutch plate and projecting outwardly therefrom in slidable engagement with the shaft 87.

Not only does the clutch plate stem 224 serve as a journal for the engaged portion of the sprocket shaft 87 by extending through a bushing bearing 225 carried by the power unit frame 201, but it serves as part of a clutch release mechanism. To this end, the clutch stem 224 is of sufficient length to extend through a clearance aperture 227 in the casing shell 17 and has its outer end portion bifurcated to provide parallel furcations 228 to accommodate slidably therebetween a flat cam finger 229 of a lever 230 which is pivotally mounted on the furcations 228 by means of a pivot pin 231 whereby the lever is movable from a normal position relative to the axis of the shaft 87 into a substantially coaxial position wherein the cam finger 229 cams against the adjacent end of the shaft 87 projecting into the space between the furcation. This causes the clutch stem 224 to be drawn axially outwardly on the sprocket shaft in opposition to the bias of the spring washer 220 to effect declutching of the clutch plate 217, whereby the sprocket shaft 87 can be relatively freely turned manually. By flipping the lever 230 back to the angular declutching position relative to the sprocket shaft, clutching re-engagement is automatically effected.

Figure 6:
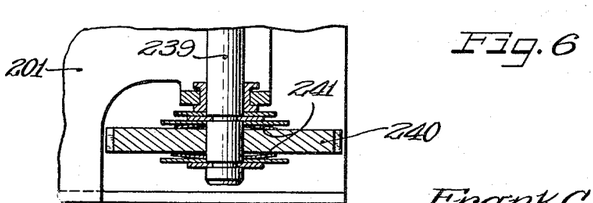
FIGURE 6 is a fragmentary vertical sectional elevational detail view taken substantially along the line VI—VI of FIGURE 3.

Focusing of the projector is also adapted to be effected by means of the power drive. To this end, the worm clutch 207 (FIGS. 1, 3 and 5) is shiftable upwardly out of driving engagement with the sprocket drive worm 208 and into driving engagement with the adjacent end of a focusing drive worm 232 for driving a focusing reduction gear train including a gear 233 meshing with the worm and having an integral pinion 234 driving an intermediate gear 235 coupled integrally or otherwise to a worm 237 driving a worm gear 238 on the upper end of a shaft 239 having on the lower end portion thereof a focusing gear 240 coupled thereto by means of a friction slip clutch structure 241 (FIG. 6). The focusing gear 240 is mounted in a horizontal plane through the axis of the focusing lens barrel 41 and extends through a horizontal clearance slot 242 in the adjacent inner side of the lens carrier 43 into mesh with the annular teeth 49 on the lens barrel. Through this arrangement, the focusing lens is adapted to be actuated for focusing by the power drive acting through the focusing gear 240 and since the focusing gear 240 is in slip clutch relation to the shaft 239 manual focusing adjustment of the lens barrel is readily effected at will.

Actuation of the worm clutch 207 is effected through a shifting lever 243 which at one end slidably engages an annular horizontal flange 244 on the clutch member, is intermediately pivoted at 245 and has its opposite end operatively connected to an armature 247 of a solenoid 248. The arrangement is such that the clutch member 207 normally gravitationally overbalances the solenoid armature, although a biasing spring may be connected to the clutch lever 243 or associated with the armature 247 for positive overbalancing. When the solenoid 248 is energized, it rocks the clutch lever 243 to shift the clutch 207 from sprocket drive to focusing drive, with the clutch returning to sprocket drive when the solenoid is deenergized.

Figure 9:
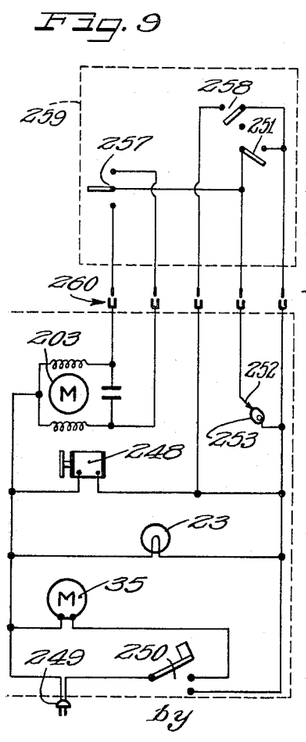
FIGURE 9 is a schematic view of the electrical circuitry involved in remote control operation of the machine.
Figure 10:
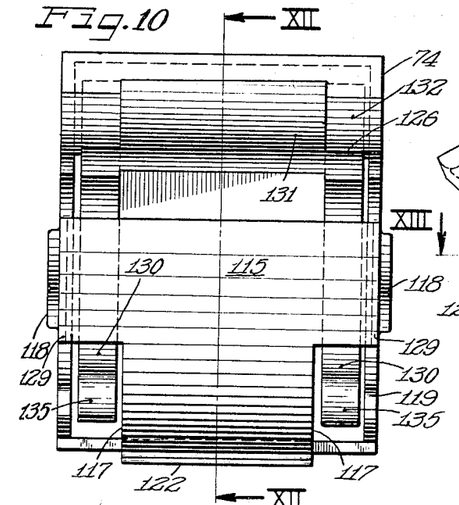
FIGURE 10 is an enlarged front elevational view of the film cartridge.

Electrical control means are provided for operation of the projector, and desirably including a remote control circuit. On reference to FIGURE 9 it will be observed that electric power is derived from any suitable source as through a plug 249 that may be plugged into the usual house current outlet and the circuit is controlled by a master switch 250 which is adapted to be mounted at any conveniently accessible place on the housing. Upon closing the switch 250, successively the fan motor 35 and then the projection lamp 23 are energized. The circuit for power drive is in parallel with the fan motor and lamp circuits and is controlled by normally open manually operable switch 251 and by a normally closed cam operated switch 252 (FIGS. 3 and 5) which is mounted adjacent to the Geneva gear 209 so that a cam 253 will engage a rotary follower 254 on a switch arm 255 to open the switch 252 at the end of each cycle of film framing rotation of the Geneva gear. Through this arrangement, the drive circuit through the motor 203 is adapted to be closed at will by closing of the switch 251 for actuation of the motor to operate the power drive. Unless the switch 251 is held closed, the motor circuit will be broken by the cam 253 after one frame advance of the film strip.

For selective forward feeding or reverse take-up drive operation of the motor, the motor circuit includes a reversing switch 257 which is readily manipulated for selective reversals of the motor. This same reversing switch 257 is adapted to be employed when the solenoid 248 has been energized by closing of a selectively operable focus switch 258 to close a circuit through the solenoid to effect coupling of the focusing drive with the motor 203. Then, by operation of the normally open control switch 251, the extent of focusing actuation of the focusing lens can be controlled in either direction, depending on the setting of the reversal switch 257.

All of the switches 251, 257 and 258 are adapted to be mounted on a remote control hand unit 259 arranged to be connected by means of a separable connector 260 to those portions of the circuits which are carried in or on the projector housing 15.

It will be understood that modifications and variations may be effected without departing from the scope of the novel concepts of the present invention.

I claim as my invention:

1. A projector including condensing and focusing lens structures in spaced alignment, and a unitary strip film handling and driving assembly including:

a supporting frame structure, a magazine assembly on one portion of the frame structure, a take-up assembly on another portion of the frame structure, a film gate mounted on said supporting structure between said assemblies and defining a framing aperture aligned between said lens structures, means carried by the frame structure for driving the film strip, and means carried by the frame structure and automatically guiding the film as fed by said driving means from said magazine assembly to and into said film gate and from said film gate into said take-up assembly.

2. A projector as defined in claim 1, wherein said film driving means includes a main driving sprocket and auxiliary driving means for advancing the leading end of a roll of film in the magazine assembly into engagement with the main driving sprocket.

3. A film projector including projection means and film gate means aligned with said projection means.
   a magazine assembly for supporting a roll of film to be projected,
   means for self-threading guiding of the film from the magazine assembly into the film gate,
   and driven roller means engageable with the outermost coil of the roll of film in the magazine to drive the film and advance the leading end from the magazine into said self-threading means.

4. A projector as defined in claim 3, wherein said roller means comprises a sprocket having a resilient periphery and resilient sprocket teeth.

5. A projector including projection means and a film magazine for supporting a roll of film,
   means for guiding the film from the magazine in a path for projection by said projection means,
   a film driving roller,
   means mounting said driving roller for movement into and out of film engaging position in said magazine,
   and means for driving said roller.

6. A projector including projection means and a film magazine for supporting a roll of film,
   means for guiding the film from the magazine in a path for projection by said projection means,
   a film driving roller,
   means mounting said driving roller for movement into and out of film engaging position in said magazine,
   a cover hingedly mounted for closing and opening said magazine,
   and means connecting said cover with said mounting means for actuating it to move the roller into film engaging relation within the magazine in the closing relation of the cover and for moving the roller out of film engaging position in the magazine in the open position of the cover.

7. A projector including projection means and film gate means aligned with the projection means,
   a film magazine,
   means for feeding film from the film magazine into the film gate including a driving sprocket,
   an auxiliary driving roll,
   means mounting the auxiliary driving roll for engagement with film in the magazine,
   and means coupling the auxiliary driving roll drivingly with said sprocket.

8. A projector including projection means and film gate means aligned with the projection means,
   a film magazine,
   means for feeding film from the film magazine into the film gate including a driving sprocket,
   an auxiliary driving roll,
   means mounting the auxiliary driving roll for engagement with film in the magazine,
   and means drivingly connecting the auxiliary driving roll with the sprocket to drive the auxiliary roll at a differential peripheral driving speed.

9. A projector including projection means and film gate means aligned with the projection means,
   a film magazine,
   means for feeding film from the film magazine into the film gate including a driving sprocket,
   an auxiliary driving roll,
   means mounting the auxiliary driving roll for engagement with film in the magazine,
   means drivingly connecting the auxiliary driving roll with the sprocket to drive the auxiliary roll at a differential peripheral driving speed,
   and means in the magazine providing a surface cooperative with the auxiliary roll to prevent binding of the film within the magazine.

10. Film magazine and feeding means for projectors comprising a magazine housing,
    a main film driving member,
    an auxiliary film driving member,
    means for driving said members,
    means shiftably mounting said auxiliary driving member,
    means biasing said auxiliary driving member into film driving engagement in the magazine housing,
    and means operative to shift the auxiliary driving member out of film driving relation to the magazine in opposition to said biasing means.

11. A projector as defined in claim 10, wherein said last mentioned means comprises a movable cover member and a connection between said cover member and said mounting means whereby opening of the cover moves the mounting means and the auxiliary driving member to shift it out of film engaging position and closing of the cover permits the biasing means to function not only to effect movement of the auxiliary driving member into film driving position but also to hold the cover in closing position.

12. Film feeding means for projectors including a magazine housing,
    a film supporting cartridge mounted in the housing,
    means for guiding film from the magazine housing,
    a film exit on the cartridge aligned with said guiding means,
    aligned openings in the housing and in the cartridge,
    and film driving means extending through said openings for driving said film out of said cartridge exit and into said guiding means.

13. Film feeding means for projectors including a magazine housing,
    a film supporting cartridge mounted in the housing,
    means for guiding film from the magazine housing,
    a film exit on the cartridge aligned with said guiding means,
    aligned openings in the housing and in the cartridge,
    film driving means extending through said openings for driving said film out of said exit and into said guiding means,
    a hinged cover comprising part of the magazine housing and adapted to be opened for removal and placement of the cartridge in the magazine housing,
    said cover being constructed and arranged to function in its closing position to retain the cartridge in the housing,
    and means biasing the cover into closing relation.

14. Film feeding means for projectors including a magazine housing,
    a film supporting cartridge mounted in the housing,
    means for guiding film from the magazine housing,
    a film exit on the cartridge aligned with said guiding means,
    aligned openings in the housing and in the cartridge,
    film driving means extending through said openings for driving said film out of said exit and into said guiding means,
    and resiliently flexible film guiding fingers within the magazine housing generally opposite the driving means and cooperating therewith to prevent binding of the film in the magazine.

15. In a magazine construction for film projectors.
    a magazine housing having film guiding means leading therefrom,
    a film cartridge supporting a roll of film,
    an exit opening from the cartridge including guide means aligned with said film guiding means,
    side walls on the cartridge,
    said side walls having outwardly projecting guide lugs, said magazine housing having side walls provided with lug receiving guides, said lugs and said lug receiving guides being oriented with respect to said film guides to effect registration of the film guides in mounting the cartridge in the magazine housing.

16. A film cartridge for supporting a roll of film in the magazine of a self-threading projector, comprising a casing having a film roll encompassing wall and side walls, said encompassing wall including a film exit and a film retaining closure portion comprising part of the encompassing wall and hinged at one end to the adjacent portion of the closure wall at a point remote from said exit and affording when open an access opening with said exit for loading and unloading the cartridge with film said closure portion having at least one opening therein adjacent a film guiding surface on said closure portion through which a film feeding means can pass to drive film around the interior of said encompassing wall and out of said film exit.

17. A cartridge as defined in claim 16, wherein said closure portion is longitudinally arcuate and the encompassing wall generally opposite the closure portion is provided with a generally straight portion.

18. A cartridge as defined in claim 16, wherein said side walls have outwardly projecting integral guide lugs for engagement with guide means in a projector magazine.

19. A combination strip film and slide projector including a projection system, means for supporting slides for projection in alignment with said projection system, means for supporting and feeding strip film through said projection system and including a film gate pivotally mounted for swinging out of registration with the projection system when slides are to be projected, a film take-up assembly including a track extension aligned with the film gate, means movably mounting the take-up assembly, and means on the film gate engageable with said track extension of the take-up assembly for moving the take-up assembly into out of the way position when the film gate is swung out of registration with the projection system.

20. A projector comprising a casing defining a housing having therein four compartments including:

a first compartment at one side of the rear portion of the housing having therein a projection lamp and forwardly thereof a concentrating lens system, a second compartment in the opposite side of the rear portion of the housing alongside the first compartment and having an air circulation fan mounted therein operative for cooling said lamp and lens system, a third compartment in the front portion of the housing alinged with said first compartment and having therein a focusing lens structure aligned with said condensing lens system and film strip handling and film feed sprocket means constructed and arranged in operative alignment at the rear of the focusing lens structure for projection of film strip frame-by-frame, a fourth compartment in the housing alongside said third compartment and forwardly of the second compartment and having power driving means therein operatively connected with said sprocket means for film feeding actuation, a transverse vertical partition between the front and rear compartments and having a projection aperture therethrough aligned with said condensing lens system and said focusing lens structure, means mounted along both the front and rear sides of said partition for alternatively supporting transparency slides for projection, and said film strip handling means including a film gate which is movable into an out of the way position with respect to the projection area of said projection aperture when the projector is to be used for slide projection.

References Cited by the Examiner
UNITED STATES PATENTS

| | | | |
|---|---|---|---|
| 695,033 | 3/1902 | Snell | 352—173 |
| 1,397,817 | 11/1921 | Mladinich | 352—242 |
| 1,738,762 | 12/1929 | De Vault | 88—28 |
| 2,243,160 | 5/1941 | Koehl | 88—28 |
| 2,296,344 | 9/1942 | Guercio | 88—28 |
| 2,301,415 | 11/1942 | Koehl | 88—24 |
| 2,342,511 | 2/1944 | Gaty | 352—72 |
| 2,456,530 | 12/1948 | Nemeth | 88—24 X |
| 2,484,248 | 10/1949 | Roehrl | 242—71.1 |
| 2,553,075 | 5/1951 | Bradford | 88—28 |
| 2,622,476 | 12/1952 | Ress | 88—28 |
| 2,632,361 | 3/1953 | Krows | 88—24 |
| 2,724,990 | 11/1955 | Bennett | 88—28 |
| 2,783,680 | 3/1957 | Goldberg | 88—28 |
| 2,793,563 | 5/1957 | Koskela | 88—28 |
| 2,812,177 | 11/1957 | Kleerup | 88—28 X |
| 2,851,923 | 9/1958 | Marvin | 352—189 X |
| 2,856,812 | 10/1958 | Barron | 88—24 X |
| 3,003,393 | 10/1961 | Kilday | 88—28 |
| 3,028,788 | 4/1962 | Zillmer | 352—140 X |
| 3,063,610 | 11/1962 | Briskin | 352—157 X |
| 3,071,041 | 1/1963 | Walter | 352—140 |
| 3,104,846 | 9/1963 | Ringle | 242—71.1 |
| 3,137,199 | 6/1964 | Townsley | 352—231 X |
| 3,145,614 | 8/1964 | Royston | 352—173 X |
| 3,152,509 | 10/1964 | Zillmer | 88—28 |
| 3,156,400 | 11/1964 | Rigby | 88—28 X |

NORTON ANSHER, *Primary Examiner.*

H. H. FLANDERS, *Assistant Examiner.*